United States Patent [19]

Bucher et al.

[11] Patent Number: 4,546,987

[45] Date of Patent: Oct. 15, 1985

[54] PACKING SEAL FOR CAST IRON PIPE JOINTS

[75] Inventors: Claude Bucher; Andre Lagabe, both of Pont-A-Mousson, France

[73] Assignee: Pont-a-Mousson S.A., Nancy, France

[21] Appl. No.: 665,858

[22] Filed: Oct. 29, 1984

[30] Foreign Application Priority Data

Oct. 28, 1983 [FR] France .................... 83 17444

[51] Int. Cl.$^4$ .................... F16J 15/32; F16L 17/00
[52] U.S. Cl. .................................... 277/207 A
[58] Field of Search ............... 277/207, 207 A, 207 B

[56] References Cited

U.S. PATENT DOCUMENTS

| | | | |
|---|---|---|---|
| 3,081,102 | 3/1963 | Murray et al. | 277/207 A |
| 3,573,871 | 4/1971 | Warner | 277/207 |
| 3,576,329 | 4/1971 | Weaver | 277/207 A |
| 3,857,589 | 12/1974 | Oostenbrink | 277/207 A |

Primary Examiner—Robert I. Smith
Attorney, Agent, or Firm—Sughrue, Mion, Zinn, Macpeak and Seas

[57] ABSTRACT

An annular elastomer packing 2 for a male-female bell housing type of pipe joint has a trapezoidal foot 12 radially opposite an anchor ridge or flange 8 which seats in a mating groove 5 in the housing, and a tapering truncated body portion 10 joined to the anchor ridge by a shoulder 6 and to the foot by a groove or recess 19. The radial compression of the foot during the initial insertion of the male pipe end serves to firmly anchor the packing via the ridge 8 and groove 5 with the recess 19 accommodating the compressively deformed material, whereafter the continued insertion of the male end radially compresses and axially extends the body portion to ensure a tight seal. This configuration reduces the insertion force and enables greater dimensional variations to be tolerated.

7 Claims, 7 Drawing Figures

PACKING SEAL FOR CAST IRON PIPE JOINTS

BACKGROUND OF THE INVENTION

The present invention concerns an annular fluid-tight packing for male-female cast iron pipe joints. The packing is made of a single hardness elastomer, is radially compressed during the insertion of the male end, and accommodates wide dimensional variations in the internal diameter of the female housing and the external diameter of the male end.

It is known that with this type of packing the relative dimensions of different constituent parts of the joint, that is, of the fluid-tight packing of the male end and of the housing are functions of:

the dimensional tolerances of the pipes;

the minimum compression of the packing required to ensure fluid-tightness under the most unfavorable conditions, such as a maximum internal diameter of the housing, a minimum external diameter of the male end, a non-axial housing interior; and irregular pipe surfaces; and the maximum admissible compression for the packing beyond which premature wearing of the elastomer occurs and the stress from coupling the male end into the housing becomes excessive.

In addition, the ease and reliability of the joint assembly and specifically the prevention of the pulling of the packing out of its place in the housing when the male end is inserted into the housing are strictly determined by the respective shapes of the radial section of the packing and the internal contour of the housing.

Furthermore, in the case of the assembly of a joint under the most unfavorable conditions described above, the annular space between the internal surface of the housing and the external surface of the male end can form a clearance such that a localized expulsion of the packing towards the exterior becomes possible under the effect of internal hydraulic pressure.

On the other hand, the body of the packing, in radial detachment with respect to its anchoring, is limited in its axial strain to its end in contact with the liquid in the pipeline by an internal shoulder of the housing.

Such an internal shoulder is necessary to prevent the pulling of the packing into the pipeline upon the insertion of the male end, which the anchoring is insufficient to prevent. Thus, when the packing body compresses to ensure fluid-tightness it cannot extend into the annular space between the housing and the male end, which considerably increases the force required for the introduction of the male end for a slight increase in its external diameter.

Such problems demonstrate the difficulty in achieving an elastic and yet fluid-tight packing for joining cast iron pipes which satisfies conditions as antagonistic as fluid-tightness at a surface pressure of at least 40 bars with extreme off-centering between the male end and the housing, a slipping stress which is not excessive and dimensional tolerances over the diameter of the pipes, and the longevity of the packing itself in chemically aggressive surroundings.

In U.S. Pat. No. 3,315,971 a fluid-tight radial compression packing is known for cast iron pipes in which a compressed flange is extended on the side of the housing bottom by a flexible annular lip stretched circumferentially and sealingly applied on the external male end cylindrical wall by the pressure of the liquid in the pipeline. However, with a low pressure the liquid can penetrate between this flexible lip and the external wall of the male end until it reaches the compressed flange, the fluid-tight housing thus being limited to a simple radial compression flange totally fixed in the housing and the flexible lip being ineffective. This leakage past the flexible lip is all the more probable as the dimensional tolerances on the diameter of the male end increase. In addition, the fluid-tight flange is exposed to oxygen if the joint is in the air or solid earth particles if the joint is buried. The result is chemical and physical aggravation to the flange, which shortens the length of service of the packing and causes leaks in the joint.

Finally, the tension of the lip makes it sensitive to the vapors of natural gas condensation, and prevents it from ensuring sound fluid-tightness with the external surface of the male end when the surface bears depressions and irregularities, the circumferentially extended lip being unable to fill the depressions.

German utility model No. GM 19 29 826 teaches an entry and guide ring for the male end within the housing, such that an anchoring for pipes of polyvinyl chloride or PVC in which a projection located radially opposite the anchoring and directed towards the bottom of the housing and having a triangular radial section, maintains the rectangular anchoring in a groove on the internal surface of the housing. However, in pipelines made of plastics one must prevent the ring from exerting too great a pressure on the external surface of the male end, to the point where it creates a localized constriction. This restriction thus limits the fluid-tightness ensured by the triangular foot or projection, as well as the possibility of maintaining the anchoring in its groove.

Furthermore, the anchoring is so substantial that its axial dimension is only slightly less than the total axial dimension of the ring, and constitutes with the opposite foot the largest part of the ring body. The result is that, if one wishes to equip such a ring with a radial compression body of sufficient size, the ring volume creates an unacceptable axial encumberment for the housing.

In addition, the diametral tolerances possible in plastic pipelines are tens of millimeters, whereas for the cast iron pipelines they are counted in millimeters. Furthermore, polyvinyl chloride pipelines have a maximum diameter of 400 mm. Finally, in this type of pipeline the housing is as flexible as the male end, whereas with cast iron pipelines the housing is much more rigid than the male end.

In French Pat. No. 2,031,925 a fluid-tight packing is disclosed for pipes with a male end and a housing, characterized by an anchoring presenting a first lobe projecting on the internal surface of the packing to ensure, through a slight compression, the stability of the anchoring in its groove on the internal surface of the housing. A second more significant lobe located at the end of the ring on the bottom side of the housing ensures, through its compression, the fluid-tightness of the joint. But in this type of packing the first lobe is not placed opposite the anchoring and the projection is quite weak, such that the anchoring is not always lodged in its groove. The bottom of the housing also has a shoulder which limits the packing extension in the axial direction upon compression and all the more increases the stress required in the assembly of the joint, especially when the male end has a maximum external diameter and the housing has the minimum internal diameter.

SUMMARY OF THE INVENTION

Applicants thus undertook the problem of achieving a fluid-tight packing for cast iron pipes which tolerates significant dimensional variations of the annular radial space between the male end and the housing, such packing being of the type with a radial compression body and anchoring means, and which significantly improves its resistance to the expulsion of pressurized liquid in the pipeline while protecting the part of the packing which ensures fluid tightness against solid particles while avoiding contact with oxygen, this packing being designed for buried as well as open-air pipelines, conducting hot as well as cold liquids, under high or low pressure.

The fluid-tight annular packing of the invention is characterized by a radial compression body having an external cylindrical or truncated cone-shaped surface with a long base and a short base, and an anchoring ridge or flange upstanding from the small base side of the trapezoidal profile of the body and radially extended inwardly by an annular compression foot with a meridian trapezoidal profile.

Through the invention, not only is the stability of the packing in the housing ensured when the joint is assembled and in service, but in addition the combination of the anchoring ridge and the opposite foot form an effective barrier to the entry of foreign materials and air.

Of course, it is necesssary to avoid oxygen contact with the packing because this decomposes the elastomers, this phenomenon being further amplified in hot-water pipelines where the rubber decomposes from the outside. In addition, a buried pipeline must undergo certain sliding movements and the settling of the earth which surrounds it, and it is appropriate to avoid the contact of solid particles with the body part of the packing which ensures fluid-tightness. Finally, the packing of the invention presents, in its zone of contact with fluid, only compressed surfaces to thereby avoid deterioration by vapors.

DETAILED DESCRIPTION OF THE PREFERRED EMBODIMENTS

Figure 1:
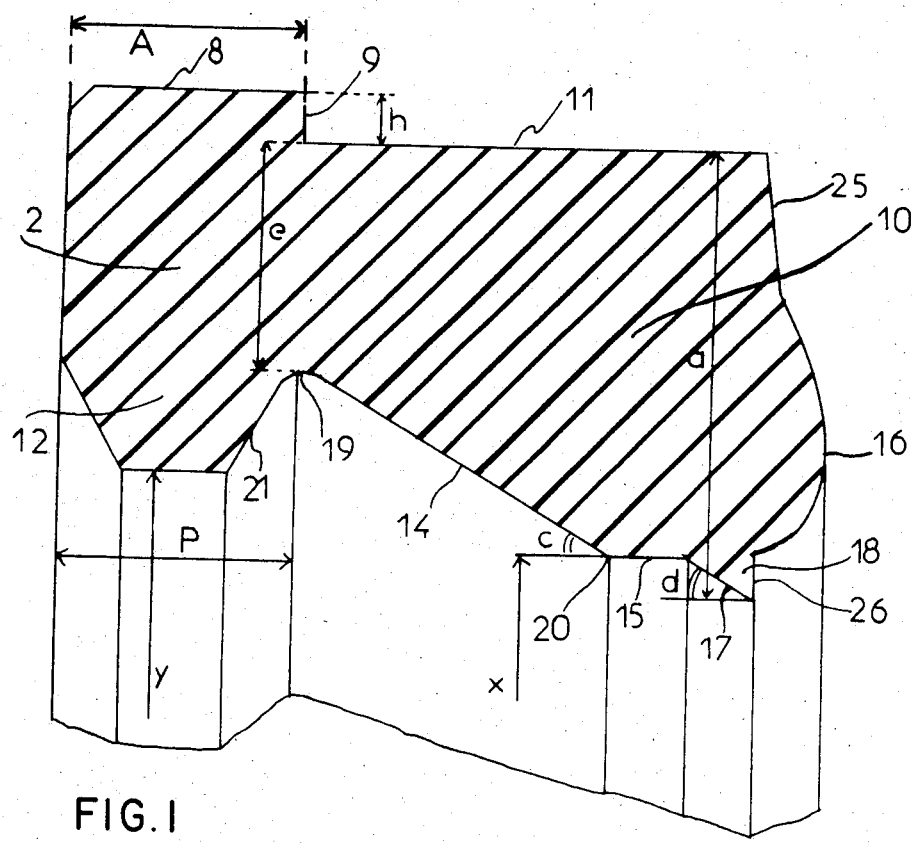
FIG. 1 is an axial section of a fluid-tight packing according to the invention.
Figure 2:
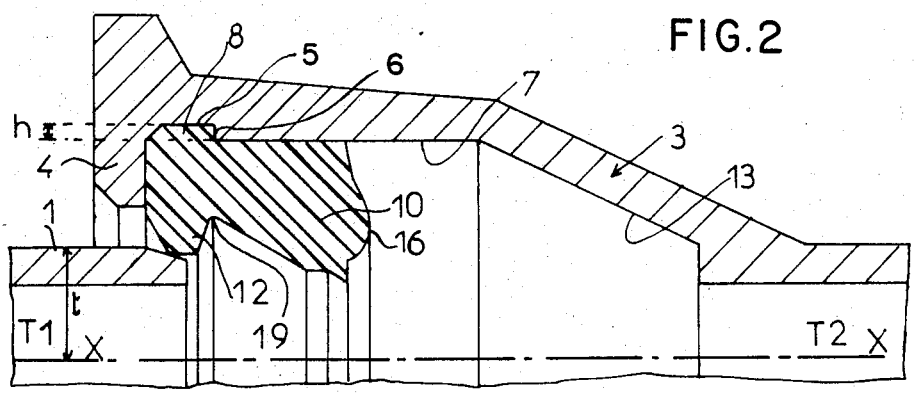
FIG. 2 is a partial axial section of a pipe housing in which the packing of the invention is lodged before the introduction of the male end of another pipe.

According to the embodiment of FIGS. 1 and 2, the fluid-tight joint of the invention comprises a male end 1 of a pipe T1, an annular fluid-tight packing 2, and a female housing 3 of a pipe T2, the pipes T1 and T2 being coaxial along an axis X—X. The entry or mouth end of the housing 3 has a flange 4, a cylindrical groove 5 coaxial with the housing, a shoulder 6 perpendicular to the axis X—X, and an internal cylindrical wall 7 having a smaller diameter than the groove 5 by a radius or height h.

The packing 2, shown in detail in FIG. 1, has an anchor ridge 8 upstanding from its external cylindrical surface of a width A corresponding to that of the groove 5, and a body 10 having an external cylindrical surface 11 to which the ridge 8 is joined by a transverse support shoulder 9. The external diameter of the ridge 8 corresponds to the internal diameter of the groove 5, and the external diameter of the body 10 corresponds to the internal diameter of the wall 7.

According to the invention, the packing has an annular foot 12 on its internal surface of trapezoidal section formed as an internal radial extension of the ridge 8, with an internal diameter less than the minimum external diameter of the male end 1. The width P of the foot 12, at the long base of the trapezoid, is equal to the width A of the ridge 8.

The body 10 following the foot 12, which is also essentially trapezoidal in section, has its short base joined to the foot and its long base facing the bottom 13 of the housing 3. A first internal surface 14 of the body forms an angle c of approximately 35° with the packing axis, and this is followed by a second internal surface 15 parallel to the packing axis and ending in a truncated conical internal surface 17 forming an angle of about 20° with the packing axis. The long base of the body 10 opposite the foot 12 defines an annular lobe 16 flanked by side surfaces 25 and 26. The latter forms a small triangular lip or sawtooth 18 with the surface 17, and the edge 20 at the intersection of surfaces 14 and 15 has a diameter x which is smaller than the minimum diameter y of the foot 12.

A triangular groove 19 is defined between the foot 12 and the body 10, and is limited by the dihedron formed by a side 21 of the foot and the body surface 14. The minimum radial thickness e of the packing 2 taken across the groove 19 is several times greater than the height h of the ridge 8.

During assembly the packing 2 is first introduced into the housing 3 of the pipe T2 with its annular ridge 8 being elastically inserted into the mating groove 5. The male end 1 of the pipe T1 is then coaxially inserted into the housing 3 which compresses the foot 12 (FIG. 3) and radially pushes the ridge 8 against the bottom of the groove 5 to thus stabilize the packing in the housing 3 and prevent the anchor ridge from being pulled out of the groove during the continued insertion of the male end. The packing 2 is thus drawn towards the bottom 13 of the housing, and its retention therewithin is implemented by the relatively low ratio between the height h of the ridge 8 and the minimum radial thickness e of the packing, and the even lower ratio between the height h and the maximum radial thickness a of the packing as seen in FIG. 1.

The foot 12 serves as a protective barrier against the entry of solid particles if the pipeline is buried or against the entry of air for a surface installation, such barrier effect being implemented by the internal diameter y of the foot being significantly smaller than the minimum external diameter t of the male end 1. This diameter relationship also ensures the radial compression of the anchor ridge 8 in its housing groove 5; the triangular groove 19 accommodates the excess rubber resulting from the compression of the foot 12 and thus prevents any initial deformation of the body 10 during assembly.

Figure 3:
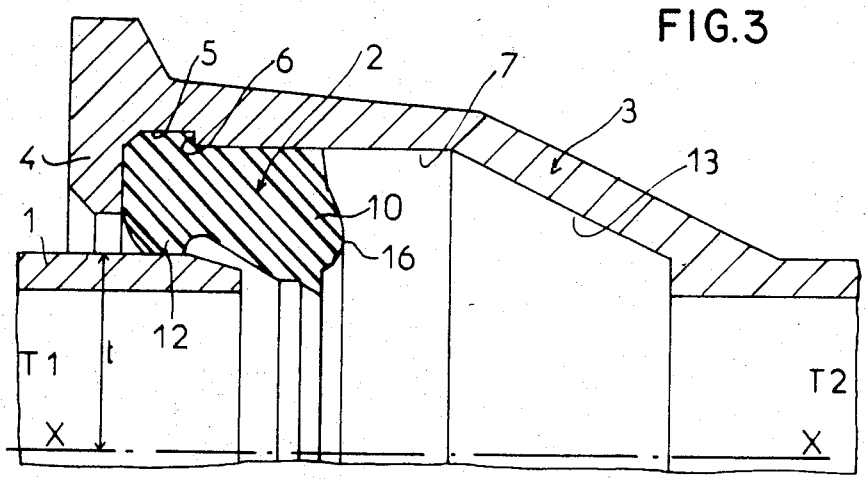
FIG. 3 is a partial axial section analogous to FIG. 2 illustrating the first step in the introduction of the male end into the housing.
Figure 4:
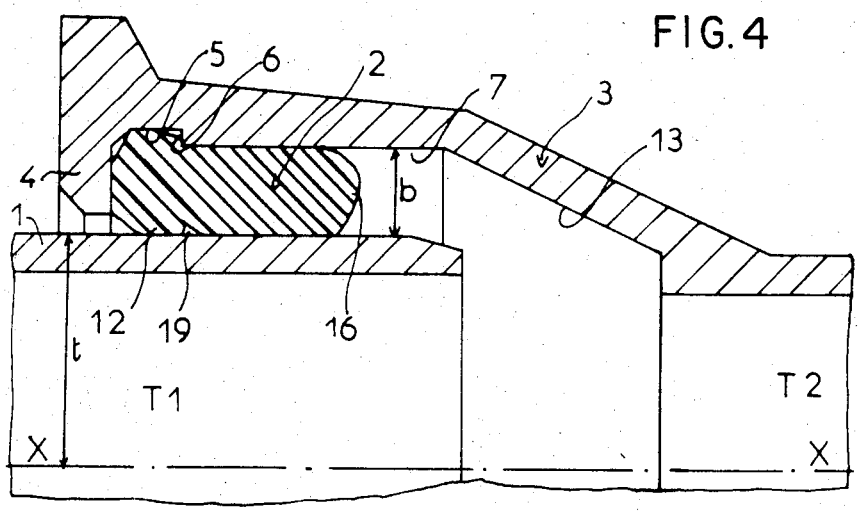
FIGS. 4 and 5 are partial axial sections illustrating the dimensional differences of the male end with maximum and minimum diameters, respectively.
Figure 5:
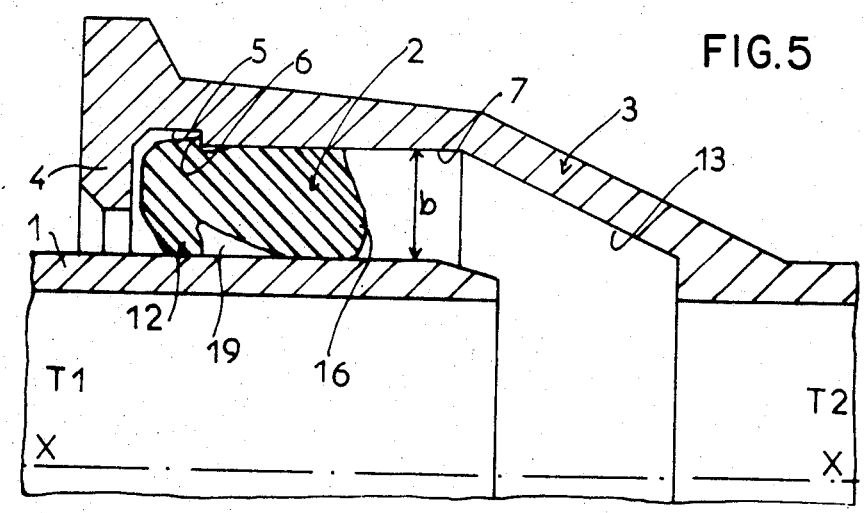

The continued introduction of the male end 1 into the housing 3 effects the radial compression and axial extension of the packing body 10, such extension being enabled by the length of the cylindrical wall 7 and housing bottom 13 being much greater than that of the packing body and by the lack of any hindering shoulders or abutments on the wall 7. Thus, the initial insertion of the male end serves to radially compress the annular foot 12 and thereby firmly seat the anchor ridge 8 in the groove 5 as seen in FIG. 3, without distorting or otherwise affecting the body portion 10 of the packing. Thereafter, the continued insertion of the male end serves to radially compress and axially extend the body 10 of the anchor packing as shown in FIG. 4, with the lip 18 enhancing the fluid-tightness of the joint by compressively penetrating into any depressions or irregularities in the rough external surface of the male end. The penetration of the male end may be stopped when the length of the packing has been exceeded as shown in FIGS. 4 or 5 for maximum and minimum diameter pipes T1, respectively, or may be continued until abutment is reached at the far end of the housing 3.

The combination of the lobe 16 with its planar flanking surfaces 25 and 26 and the groove 19 at the other end of the packing body 10 implements a smooth and progressive compression of the body without any internal folding and attendant force concentrations at its internal end, which significantly reduces the necessary insertion force as compared with the single lobe packing described in French Pat. No. 1,172,962 wherein no lobe flanking surfaces or internal groove are provided. Tests indicate that the insertion force required for a packing according to such patent is about 1.4 times greater than that required with the packing of this invention. Moreover, as the surface of the lobe 16 and the surface 17 of the lip 18 are not subjected to significant compression forces, the life of the packing is thereby increased.

In addition, in a comparison with the compression packing of the type disclosed in French Pat. No. 2,343,191 for the same maximum radial thickness a and the same difference in diameter b between the internal diameter of the housing and the external diameter of the male end, and thus the same packing compression ratio, the insertion force was decreased by 30% with the packing of this invention—which allows the packing to be used at a compression rate near 45% without increasing the assembly stress. This permits dimensional tolerances of up to 10 mm in the diameter of the male end and the internal diameter of the housing, as compared with only 6 mm allowed by the packing of the '191 patent. Further, at an equal rate of compression and with the packing force being lower than 40%, the wear of the packing is greatly decreased and the absence of force concentrations in the rubber enables tighter sealing.

The resistance of the packing to the penetration of the male end does not significantly vary with the construction of this invention. In a joint obtained therewith variations in the diameter of the male end are easily accommodated by the annular groove 9 as may be seen by comparing FIGS. 4 and 5. This groove thus separates the foot 12 from the body 10 and enables the foot to form a barrier between the body and the external surroundings of the joint.

By decreasing the assembly stress or force, dimensional variations of several millimeters can be tolerated between the male end and the housing while still preserving the fluid-tight integrity of the joint for service pressures of 40 to 60 bars. As examples, dimensional variations at the male end of 8.5 mm for a 150 mm diameter pipe and 11.5 mm for a 600 mm diameter pipe can easily be accommodated. Moreover, the rigid anchoring of the packing by the radial compression of the foot 12 and the ridge 8 precludes any axial expulsion of the body 10 from the housing due to the liquid pressure within the pipes.

Figure 6:
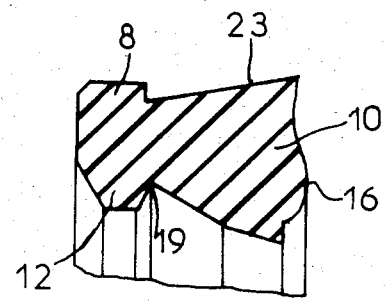
FIG. 6 is an axial section, analogous to FIG. 1 but on a smaller scale, of a variation of the packing according to the invention.
Figure 7:
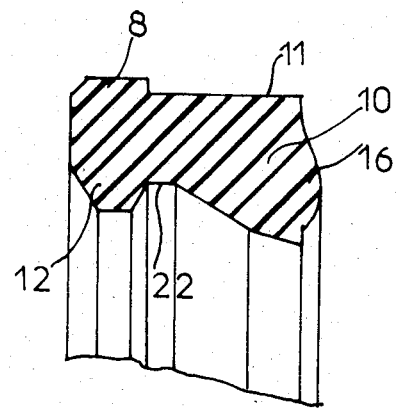
FIG. 7 is an axial section, analogous to FIGS. 1 and 6, of another variation of the packing.

FIG. 6 shows a variation wherein the outer surface 23 of the body portion 10 is outwardly flared or divergent to accommodate a correspondingly configured internal housing profile. This arrangement enhances the axial extension of the body 10 upon radial compression and thus renders the insertion force of the male end more constant. In the further variation of FIG. 7 the groove between the foot 12 and the body 10 is widened and trapezoidal as at 22. Although this tends to increase the length and thus the weight of the packing, it attendantly enhances its resistance to crushing.

What is claimed is:

1. An annular fluid-tight elastomer packing (2) for a joint between a male end (1) and a female end bell housing (3) of chill-molded centrifugally cast iron pipes, said packing comprising:
    (a) a body portion (10) adapted to be radially compressed and axially extended during the insertion of the male pipe end into the bell housing, a radial cross-section of the body portion defining a generally trapezoidal profile having inner long and outer short bases, a radially outer side (11; 23) for engagement against a cylindrical surface (7) of the housing, and an inwardly sloping radially inner side (14) for complementary deformation by and sealing engagement with the outer surface of the inserted male pipe end, and
    (b) an anchoring and barrier portion integral with the body portion at the outer short base thereof and defining in radial cross-section an anchor ridge (8) extending radially outwardly beyond the outer side of the body portion for engagement in a matingly configured groove (5) in the housing, and a radially inwardly extending isosceles trapezoid shaped compression foot (12) radially opposite the anchor ridge and connected to the sloping side of the body portion by an annular groove (19; 22), whereby the initial insertion of the male pipe end radially compresses the anchoring and barrier portion to firmly seat the anchor ridge in its housing groove and thereby fix the packing in its intended position in the housing with axially squeezed material being accommodated in the annular groove, and the continued male end insertion progressively radially compresses and axially extends the body portion via engagement with the sloping side thereof to establish a fluid-tight seal, the anchoring and barrier portion thereafter serving to isolate the body portion from the external environment.

2. A packing according to claim 1, wherein the long base of the body portion comprises, from the outer side to the sloping inner side, a first planar surface (25), an outwardly projecting lobe (16), and a second planar surface (26).

3. A packing according to claim 1, wherein the axial width (P) of the foot (12) across a long base of its trapezoidal profile is equal to the axial width (A) of the anchor ridge (8).

4. A packing according to claim 1, wherein the height (h) of the radial projection of the anchor ridge (8) with respect to the outer side of the packing is less than one-third the minimum thickness (e) of the packing taken across the short base of the body portion.

5. A packing according to claim 2, wherein the sloping inner side (14) of the body portion is followed by a cylindrical internal surface (15) whose intersection with the sloping side defines a circular edge (20).

6. A packing according to claim 5, wherein the circular edge has a diameter (x) which is less than the minimum diameter (y) of the compression foot (12).

7. A packing according to claim 5, wherein the long base of the body portion is joined to the cylindrical internal surface (15) thereof by a small triangular lip (18) with a sawtooth contour formed by a truncated cone-shaped internal surface (17) adjacent to the internal surface and by the second planar surface (26).

* * * * *